United States Patent
Lindoff et al.

(10) Patent No.: US 9,955,514 B2
(45) Date of Patent: Apr. 24, 2018

(54) METHOD FOR D2D RADIOCOMMUNICATION

(71) Applicant: Telefonaktiebolaget L M Ericsson (publ), Stockholm (SE)

(72) Inventors: Bengt Lindoff, Bjarred (SE); Qianxi Lu, Beijing (CN); Qingyu Miao, Beijing (CN); Leif Wilhelmsson, Dalby (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 415 days.

(21) Appl. No.: 14/430,226

(22) PCT Filed: Sep. 28, 2012

(86) PCT No.: PCT/CN2012/082391
§ 371 (c)(1),
(2) Date: Mar. 22, 2015

(87) PCT Pub. No.: WO2014/047905
PCT Pub. Date: Apr. 3, 2014

(65) Prior Publication Data
US 2015/0250011 A1  Sep. 3, 2015

(51) Int. Cl.
*H04W 24/04* (2009.01)
*H04W 76/02* (2009.01)
(Continued)

(52) U.S. Cl.
CPC ....... *H04W 76/023* (2013.01); *H04L 41/0654* (2013.01); *H04W 36/0055* (2013.01); *H04W 72/0453* (2013.01); *H04W 76/028* (2013.01)

(58) Field of Classification Search
None
See application file for complete search history.

(56) References Cited

U.S. PATENT DOCUMENTS

2010/0279672 A1  11/2010  Koskela et al.
2012/0106461 A1   5/2012  Kasslin et al.
(Continued)

FOREIGN PATENT DOCUMENTS

CN     102083138 A    6/2011

OTHER PUBLICATIONS

Supplementary European Search Report, dated Apr. 13, 2016, in connection with European Application No. 12885705, all pages.
(Continued)

*Primary Examiner* — Edan Orgad
*Assistant Examiner* — Sithu Ko
(74) *Attorney, Agent, or Firm* — Leffler Intellectual Property Law, PLLC

(57) ABSTRACT

The present disclosure relates to a method of radio communication between a first radio device and a second radio device using a first frequency resource and a first communication protocol by means of a network node, at least one of the radio devices being served by said network node. The method comprises determining a second frequency resource to use for non-network assisted device-to-device (D2D) communication between the first and second radio devices in case of a radio link failure between said at least one radio device and the network node. The method also comprises determining a second communication protocol to use for the non-network assisted D2D communication between the first and second radio devices in the case of a radio link failure between said at least one radio device and the network node.

14 Claims, 3 Drawing Sheets

(51) Int. Cl.
     *H04L 12/24*      (2006.01)
     *H04W 36/00*     (2009.01)
     *H04W 72/04*     (2009.01)

(56) References Cited

U.S. PATENT DOCUMENTS

2013/0150051 A1*   6/2013   Van Phan ............. H04W 12/04
                                                                                 455/437
2013/0301438 A1*  11/2013   Li ....................... H04W 76/048
                                                                                       370/252

OTHER PUBLICATIONS

European Written Opinion, dated Apr. 13, 2016, in connection with European Application No. 12885705, all pages.
ETSI EN 300 396-10 V1.1.2 (Aug. 2002); Terrestrial Trunked Radio (TETRA); Technical requirements for Direct Mode Operation (DMO); Part 10: Managed Direct Mode Operation (M-DMO); 43 pages.
3GPP TR 22.803 V1.0.0 (Aug. 2012); 3rd Generation Partnership Project; Technical Specification Group SA; Feasibility Study for Proximity Services (ProSe) (Release 12); 33 pages.
PCT International Search Report, dated Jul. 11, 2013, in connection with International Application No. PCT/CN2012/082391, all pages.
PCT Written Opinion, dated Jul. 11, 2013, in connection with International Application No. PCT/CN2012/082391, all pages.

* cited by examiner

METHOD FOR D2D RADIOCOMMUNICATION

TECHNICAL FIELD

The invention relates to a methods and devices of radio communication between a first radio device and a second radio device using a first frequency resource and a first communication protocol by means of a network node, at least one of the radio devices being served by (or connected to) said network node.

BACKGROUND

Device-to-Device (D2D) communication refers to direct communication between devices. In D2D communication, data to be transmitted from a first device to a second device is typically not relayed via any cellular network. Some examples of D2D communication of the prior art are Bluetooth communication, FlashlinQ communication, Wireless Local Area Network (WLAN, e.g. IEEE 802.11) communication (e.g. WIFI Direct).

Device-to-device communication may be applicable in various scenarios. One scenario is when a cellular radio access network is present, and able to set up a cellular connection between two devices. D2D communication may be a complement to the cellular communication in such scenarios.

There may be situations when D2D communication may provide better performance (better signal quality, higher bit rate, lower latency, etc) than cellular communication. This may be due to proximity between the devices and/or specific signalling gain of the D2D protocol (e.g. hop gain).

In some situations, the network may have constraints (e.g. due to being heavily loaded) resulting in that a service cannot be provided at all using a network connection. Then, D2D communication would be an alternative.

There may also be situations when D2D communication may be preferred by the user of a device (e.g. due to billing costs).

D2D communication may improve spectrum efficiency and reduce the network load for the cellular network, since the D2D connection typically uses another spectrum range (e.g. an unlicensed spectrum) than the cellular network (typically licensed spectrum). Furthermore, since cellular communication uses an uplink-downlink pair for each of the two devices while a D2D connection would only use one link pair, spectrum efficiency is improved even if the D2D connection would use cellular spectrum resources. This would be true even for network assisted D2D communication where most of the data would be transmitted over the D2D connection and only a small amount of information is to be transmitted over the network link.

D2D communication may be ad hoc or may be network assisted. For example, a cellular network may assist a D2D connection by establishing security of the D2D link and/or partly or fully controlling the setup of the D2D connection (e.g. device/peer discovery and resource allocation). A cellular network may also assist D2D communication by controlling the interference environment. For example, if using licensed operator's spectrum for the D2D communication, higher reliability can be provided than when operating in unlicensed spectrum. To assist the D2D connection, the network may also provide synchronization and/or partial or full Radio Resource Management (RRM—may e.g. comprise time and/or frequency resource allocation for the D2D communication).

In a typical cellular communication system, there are standardized procedures for connection setup and connection release (disconnection). There are typically also defined procedures for how to act in radio link failure (RLF), a scenario when a radio link is lost in an uncontrolled way (without connection release being performed). Such scenarios may be encountered e.g. when a device goes out of coverage, due to erroneous device operation, due to battery removal, etc. D2D communication may e.g. be used in catastrophic situations or in National Security and Public Safety (NSPS) situation, used by police or the like, where cellular coverage is not always available.

Radio link monitoring procedures is typically defined for prior art cellular systems. Such procedures may include the device monitoring the radio channel and synchronization status with the network and define how to proceed of e.g. the synchronization is lost.

For example in Wideband Code Division Multiple Access (WCDMA) and Long Term Evolution (LTE), the wireless communication device monitors the down link (DL) channel conditions and determines whether the DL is in-sync or out-of-sync. This determination may be based on whether the device can reliably decode the DL information. If out-of-sync is detected, the device is to perform a number of actions, e.g. start higher layer connection release timers (indicating how long the device should try to re-synchronize before performing a formal connection release) and set transmission constraints (to limit the potential interference caused by the device if transmitting without reliable detection of DL power control information).

There is thus a need to improve the handling of a RLF during communication between two radio communication devices aided by a cellular network, either cellular communication or network (NW) assisted D2D communication.

SUMMARY

It is an objective of the present disclosure to provide improved methods and devices for handling a RLF of a radio link to a cellular network during communication aided by said cellular network between two radio communication devices.

According to an aspect of the present disclosure, there is provided a method of radio communication between a first radio device and a second radio device using a first frequency resource and a first communication protocol by means of a network node, at least one of the radio devices being served by said network node. The method comprises determining a second frequency resource to use for non-network assisted device-to-device (D2D) communication between the first and second radio devices in case of a radio link failure between said at least one radio device and the network node. The method also comprises determining a second communication protocol to use for the non-network assisted D2D communication between the first and second radio devices in the case of a radio link failure between said at least one radio device and the network node.

In some embodiments, the method above is performed in the network node. Then the network node may send at least one message to the first radio device, the at least one message comprising information about the determined second frequency resource and second communication protocol, the information being intended to enable the first radio device to initiate non-network assisted D2D communication with the second radio device using said determined second frequency resource and second communication protocol in the case of a radio link failure between said at least one radio device and the network node. In this way, the network node can inform the radio device of the determined second frequency resource and second communication protocol, enabling the radio device to proceed with non-NW assisted D2D using said second frequency resource and second communication protocol if desired/needed.

In some embodiments, the network node sends a message to the second radio device, the message comprising information about the determined second frequency resource and second communication protocol, the information being intended to enable the second radio device to initiate non-network assisted D2D communication with the first radio device using said determined second frequency resource and second communication protocol in the case of a radio link failure between said at least one radio device and the network node. In this way, the network node can inform both of the radio devices about the determined second frequency resource and second communication protocol, facilitating the radio device proceeding with non-NW assisted D2D using said second frequency resource and second communication protocol if desired/needed. This may be an alternative to the first radio device informing the second radio device of the determined second frequency resource and second communication protocol.

In some embodiments, the network node estimates the likelihood of it being possible to initiate non-network assisted D2D radio communication between the first and second radio devices, before the sending of a message to the first radio device. Unless the radio devices are able to communicate by non-NW assisted D2D, it may be unnecessary to inform the device(s) of the determined second frequency resource and second communication protocol. The estimation may e.g. be based on the respective configurations of the first and/or second devices, or on the proximity of the devices to each other e.g. whether both devices are served by the same base station or based on obtained geographical positions of one or both of the first and second devices.

In some other embodiments, the method is performed in the first radio device. The first radio device may additionally determine whether the radio link to the network node has failed. If it is determined that the radio link has failed, the first radio device may initiate non-network assisted D2D communication with the second radio device, using the determined second frequency resource and the determined second communication protocol.

In some embodiments, the first radio device may send a first message to the second radio device. In response to the sent first message, the first radio device may receive a second message from the second radio device, the received message containing information, on which information the determining of the second frequency resource and the second communication protocol is based. This exchange of messages may enable the first and second radio devices to discuss, negotiate and/or agree upon which second frequency resource and second communication protocol to determine for use in non-network assisted D2D communication if desired/needed. In some embodiments, the first message is sent and the second message is received during setup of the communication by means of the network node with the second device. This implies that when communication which is aided by the network is set up between the first and second devices (cellular communication or NW assisted D2D communication) the devices determine, already at this early stage, the second frequency resource and second communication protocol.

According to another aspect of the present disclosure, there is provided a method of a first radio device in radio communication with a second radio device using a first frequency resource and a first communication protocol by means of a network node, the first radio device also being served by said network node. The method comprises receiving, from the network node, information about a second frequency resource to use for non-network assisted D2D communication between the first and second radio devices in case of a radio link failure between the first radio device and the network node. The method also comprises receiving, from the network node, information about a second communication protocol to use for non-network assisted D2D communication between the first and second radio devices in the case of a radio link failure between the first radio device and the network node. The method also comprises determining that the radio link to the network node has failed. The method also comprises initiating non-network assisted D2D communication with the second radio device using the second frequency resource and the second communication protocol.

According to another aspect of the present disclosure, there is provided a computer program product comprising computer-executable components for causing a device, e.g. the first radio device or the network node, to perform an embodiment of a method of the present disclosure when the computer-executable components are run on a processor comprised in the device.

According to another aspect of the present disclosure, there is provided a computer program for radio communication between a first radio device and a second radio device using a first frequency resource and a first communication protocol by means of a network node, at least one of which radio devices being served by said network node. The computer program comprises computer program code which is able to, when run on a processor of a device e.g. the first radio device or the network node, cause the device to determine a second frequency resource to use for non-network assisted D2D communication between the first and second radio devices in case of a radio link failure between said at least one radio device and the network node. The computer program also causes the device to determine a second communication protocol to use for the non-network assisted D2D communication between the first and second radio devices in the case of a radio link failure between said at least one radio device and the network node.

According to another aspect of the present disclosure, there is provided a computer program for a first radio device in radio communication with a second radio device using a first frequency resource and a first communication protocol by means of a network node, the first radio device being served by said network node. The computer program comprises computer program code which is able to, when run on a processor of the first radio device, cause said first radio device to receive, from the network node, information about a second frequency resource to use for non-network assisted D2D communication between the first and second radio devices in case of a radio link failure between the first radio device and the network node. The computer program also causes the first radio device to receive, from the network node, information about a second communication protocol to use for non-network assisted D2D communication between the first and second radio devices in the case of a radio link failure between the first radio device and the network node. The computer program also causes the first radio device to determine that the radio link to the network node has failed. The computer program also causes the first radio device to initiate non-network assisted D2D communication with the second radio device using the second frequency resource and the second communication protocol.

According to another aspect of the present disclosure, there is provided a computer program product comprising an embodiment of a computer program according to the present disclosure and a computer readable means on which the computer program is stored.

According to another aspect of the present disclosure, there is provided a network node configured for being served by a first radio device when the first radio device is in radio communication with a second radio device using a first frequency resource and a first communication protocol by means of the network node. The network node comprises a processor, and a storage unit storing instructions that, when executed by the processor, cause the network node to determine a second frequency resource to use for non-network assisted D2D communication between the first and second radio devices in case of a radio link failure between said at least one radio device and the network node. The instructions also cause the network not to determine a second communication protocol to use for the non-network assisted D2D communication between the first and second radio devices in the case of a radio link failure between said at least one radio device and the network node. The instructions also cause the network not to send at least one message to the first radio device, the at least one message comprising information about the determined second frequency resource and second communication protocol, the information being intended to enable the first radio device to initiate non-network assisted D2D communication with the second radio device using said determined second frequency resource and second communication protocol in the case of a radio link failure.

According to another aspect of the present disclosure, there is provided a first radio device configured for being in radio communication with a second radio device using a first frequency resource and a first communication protocol by means of a network node, and for being served by said network node. The first radio device comprises a processor, and a storage unit storing instructions that, when executed by the processor, cause the radio device to determine a second frequency resource to use for non-network assisted D2D communication between the first and second radio devices in case of a radio link failure between said at least one radio device and the network node. The instructions also cause the first radio device to determine a second communication protocol to use for the non-network assisted D2D communication between the first and second radio devices in the case of a radio link failure between said at least one radio device and the network node. The instructions also cause the first radio device to determine that the radio link to the network node has failed. The instructions also cause the first radio device to initiate non-network assisted D2D communication with the second radio device, using the determined second frequency resource and the determined second communication protocol.

According to another aspect of the present disclosure, there is provided a first radio device configured for being in radio communication with a second radio device using a first frequency resource and a first communication protocol by means of a network node, and for being served by said network node. The first radio device comprises a processor, and a storage unit storing instructions that, when executed by the processor, cause the radio device to receive, from the network node, information about a second frequency resource to use for non-network assisted D2D communication between the first and second radio devices in case of a radio link failure between the first radio device and the network node. The instructions also cause the first radio device to receive, from the network node, information about a second communication protocol to use for non-network assisted D2D communication between the first and second radio devices in the case of a radio link failure between the first radio device and the network node. The instructions also cause the first radio device to determine that the radio link to the network node has failed. The instructions also cause the first radio device to initiate non-network assisted D2D communication with the second radio device using the second frequency resource and the second communication protocol.

It is advantageous to, in accordance with any of the above aspects of the present disclosure, determine a second frequency resource and a second communication protocol to use for non-NW assisted D2D communication in case of e.g. an RLF between any of the radio devices and the network. By enabling that the radio devices knows which frequency resource and communication protocol to hand over to in case needed, while still being served by the network, the handover can be initiated, and the D2D communication, may proceed smoothly even in case of an unexpected failure of the radio link to the NW. The on-going communication between the radio devices may then not be interrupted at all in case of an RLF, or the time period of any interruption can at least be reduced. Also, it is advantageous to enable communication between two radio devices which can more easily be handed over between different kinds of communication and different resources depending on whether the devices are within coverage of a cellular network or not. The communication between the devices is then made more robust and the risk of interruption of the ability of the devices to communicate with each other is reduced. This can be important e.g. in National Security and Personal Safety (NSPS) scenarios, where for instance police radio communication could function more robustly, regardless of NW coverage, by means of the present disclosure.

In some embodiments, both the first and the second radio devices are served by the network node and the radio communication between the first and second radio devices is via said network node. This implies that the communication between the devices prior to any RLF or handover to D2D communication is cellular communication via the network.

In some other embodiments, the radio communication between the first and second radio devices is network assisted D2D communication by means of the network node. This implies that the communication between the devices prior to any RLF or handover to non-NW assisted D2D communication is D2D communication but that this D2D communication is assisted by the NW where the NW e.g. controls that the D2D communication is in sync with the NW and/or specifies the scheduling resources for the D2D communication.

In some embodiments, the network node is one of a base station, such as a Node B or evolved Node B, a radio access network (RAN) node, or a core network (CN) node. If the network node discussed herein is not a base station, the first radio device may be served by the network node via a base station and/or other network node(s).

In some embodiments, the second frequency resource is within an unlicensed frequency band. Thus it may not interfere with communication within the licenced bands, e.g. with the cellular network of the network node discussed herein. The unlicensed frequency bad may e.g. be an industrial, scientific and medical (ISM) radio band.

In some embodiments, the second communication protocol is one of a Wireless Local Area Network protocol e.g. Wi-Fi Direct, a Bluetooth protocol, or a Zigbee protocol. It is also conceivable that the second communication protocol may be a FlashlinQ protocol. In some other embodiments, the second communication protocol is an LTE D2D communication protocol. It is conceivable that an LTE standard for D2D communication, NW assisted as well as non-NW assisted, will be developed, possibly allowing D2D to communication to be performed in a licenced LTE frequency band. In general, the second communication protocol may be any protocol possible for non-NW assisted D2D communication, e.g. an ad hoc network protocol.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

The invention is now described, by way of example, with reference to the accompanying drawings, in which.

DETAILED DESCRIPTION

Figure 1:
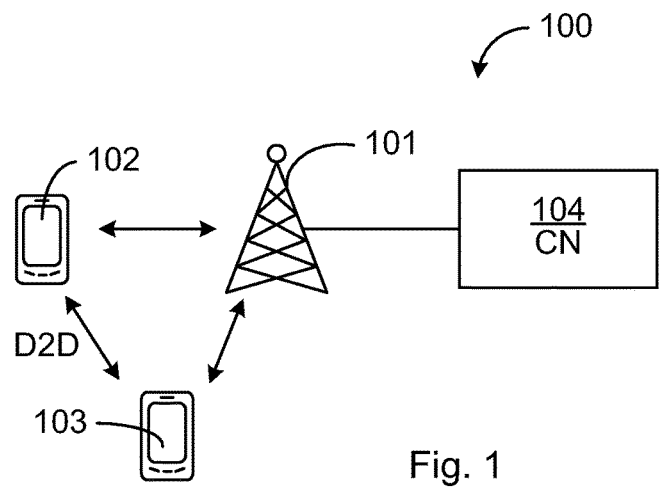
FIG. 1 is a schematic diagram of a cellular network associated with two radio devices, according to the present disclosure.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Radio link failure (RLF) as discussed herein relates to a failure in a radio link between the first and/or the second radio device and the network (NW), e.g. the network node discussed herein.

There are herein discussed three different types of communications or communication paths between the first and second radio devices:
1. Cellular radio communication, where the data which is transmitted between the two radio devices passes via the network.
2. Network assisted D2D communication, where at least one of the radio devices is served by and in sync with the network, and exchanges information with the network for maintaining a D2D communication with the other radio device where at least a part of the data transmitted between the radio devices is transmitted directly and does not pass via the network.
3. Non-NW assisted D2D, where the first and second devices communicates directly with each other without involving the NW.

When it is herein stated that the radio communication between the first radio device and the second radio device is by means of a network node, this includes both the situation 1. of cellular radio communication and the situation 2. of network assisted D2D. In both cases, the communication is by means of/aided by/controlled by the network, e.g. by the network node or higher up in the network via the network node. The present disclosure relates to facilitating a handover (HO) from one of the situation 1. and 2. to the situation of 3. in case of an RLF.

It should be noted that it is conceivable that network assisted D2D may be performed even if only the first radio device is covered by the NW (is served by the network node). In that case, the first radio device can forward information from the network node to the second radio device, just as the first radio device can forward any information received from the network node about the second frequency resource and communication protocol to the second radio device.

It should also be noted that in some embodiments of the present disclosure, one or both of the first and second radio devices determine the second frequency resource and communication protocol without involving the network or network node, while in other embodiments of the present disclosure, the second frequency resource and communication protocol are determined by the network e.g. the network node to which the first radio device is connected.

A frequency resource as discussed herein is frequency/frequencies or one or more frequency band(s)/spectrum(s) which is used or can be used by the first and/or second radio devices for communicating with each other, either (in case of the first frequency recourse) via the network or D2D. In case of an Orthogonal Frequency Division Multiplexing (OFDM) system, a frequency resource may be a set of sub-carriers. For instance in LTE, the frequency resource may be a set of resource blocks (each resource block consisting of e.g. 12 sub-carriers).

Similarly, a communication protocol is any communication protocol or standard or ratio access technology (RAT) which can be used by the first and/or second radio devices for communicating with each other, either (in case of the first communication protocol) via the network or D2D. Examples of communication protocols include Long Term Evolution (LTE) standards and Wideband Code Division Multiple Access/High Speed Packet Access (WCDMA/HSPA) standards.

Non-assisted D2D communication may be in accordance with one of a Wireless Local Area Network protocol e.g. Wi-Fi Direct, a Bluetooth protocol, a FlashlinQ protocol, or a Zigbee protocol. It is also conceivable that an LTE D2D communication protocol is used. It is conceivable that an LTE standard for D2D communication, NW assisted as well as non-NW assisted, will be developed, possibly allowing D2D communication to be performed in a licenced LTE frequency band.

Non-assisted D2D communication may be performed within an unlicensed frequency band. Thus it may not interfere with communication within the licenced bands, e.g. with the cellular network of the network node discussed herein. The unlicensed frequency bad may e.g. be an industrial, scientific and medical (ISM) radio band.

The radio device may be any device, mobile or stationary, enabled to communicate over a radio cannel, for instance but not limited to e.g. mobile phone, smart phone, modem, sensors, meters, vehicles, household appliances, medical appliances, media players, cameras, or any type of consumer electronic, for instance but not limited to television, radio, lighting arrangements, tablet computer, laptop, or PC.

The cellular NW which comprises the NW node discussed herein, may be any cellular network, in accordance with any communication standard, able to communicate with a radio device over a radio interface. Examples of communication standards are the 3GPP standards, such as an LTE or Wideband Code Division Multiple Access/High Speed Packet Access (WCDMA/HSPA) standard.

FIG. 1 schematically illustrates an embodiment of a cellular network 100 comprising a radio access network (RAN) comprising a base station 101, which may be the network node discussed herein, to which a first radio device 102 is connected (as indicated by the double-headed arrow between the node 101 and the radio device 102). The network node/base station 101 is connected to a core network 104 of the network 100. The first radio device 102 is involved in D2D communication with a second radio device 103 (as indicated by the double-headed arrow there between). The second radio device 103 may also be served by the network node 101 (as indicated by the double-headed arrow between the node 101 and the second radio device 103). Alternatively, the second radio device 103 is not served by the network node, or to the network at all. The second radio device may then receive network information via the first radio device 102. In case of an RLF between the network node 101 and the first and/or second radio device, the radio devices may in accordance with the present disclosure proceed communicating with each other by means of a handover to non-NW assisted D2D communication using the second frequency resource and the second communication protocol as discussed herein.

Figure 2:
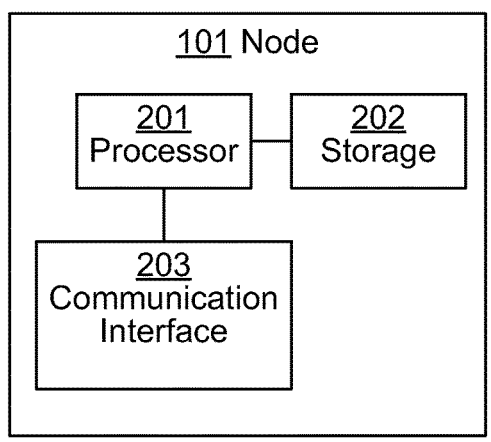
FIG. 2 is a schematic block diagram of an embodiment of a network node of the present disclosure.

FIG. 2 is schematically illustrates an embodiment of a network node 101, e.g. similar to the base station 101 of FIG. 1. As mentioned above, the network node 101 may e.g. be part of the core network 104 or the radio access network (RAN) such as be comprised in the radio base station of FIG. 1. The network node 101 comprises a processor 201 e.g. a central processing unit (CPU). The processor 201 may comprise one or a plurality of processing units in the form of microprocessor(s). However, other suitable devices with computing capabilities could be comprised in the processor 201, e.g. an application specific integrated circuit (ASIC), a field programmable gate array (FPGA) or a complex programmable logic device (CPLD). The processor 201 is configured to run one or several computer program(s) or software stored in a storage unit 202 e.g. a memory. The storage unit is regarded as a computer readable means and may e.g. be in the form of a Random Access Memory (RAM), a Flash memory or other solid state memory, or a hard disk. The processor 201 is also configured to store data in the storage unit 202, as needed. The network node 101 also comprises a communication interface 203. The communication interface is configured for communication with the network node 100. If the network node is located in a base station, the communication interface 203 is used to enable communication with the core network (CN) 104 and/or the radio devices 102 and 103 served by the base station. If the communication interface 203 is located in the CN, e.g. in a core network node, it may be used to communicate information to the radio device(s) via the base station.

Figure 3:
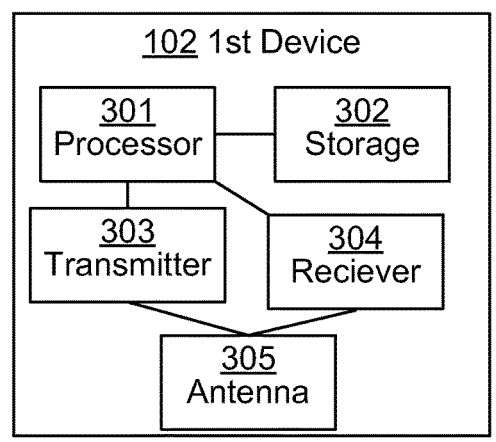
FIG. 3 is a schematic block diagram of an embodiment of a radio device of the present disclosure.

FIG. 3 schematically illustrates an embodiment of a first radio device 102 of the present disclosure. It is noted that the description of the first radio device with reference to FIG. 3 is also relevant to the second radio device 103. The radio device 102 comprises a processor or central processing unit (CPU) 301. The processor 301 may comprise one or a plurality of processing units in the form of microprocessor(s). However, other suitable devices with computing capabilities could be used, e.g. an application specific integrated circuit (ASIC), a field programmable gate array (FPGA) or a complex programmable logic device (CPLD). The processor 301 is configured to run one or several computer program(s) or software stored in a storage unit or memory 302. The storage unit is regarded as a computer readable means and may e.g. be in the form of a Random Access Memory (RAM), a Flash memory or other solid state memory, or a hard disk. The processor 301 is also configured to store data in the storage unit 202, as needed. The radio device 102 also comprises a transmitter 303, a receiver 304 and an antenna 305, which may be combined to form a transceiver or be present as distinct units within the radio device 102. The transmitter 303 is configured to cooperate with the processor to transform data bits to be transmitted over a radio interface to a suitable radio signal in accordance with the RAT used by the RAN via which the data bits are to be transmitted. The receiver 304 is configured to cooperate with the processor 301 to transform a received radio signal to transmitted data bits. The antenna 305 may comprise a single antenna or a plurality of antennas, e.g. for different frequencies and/or for MIMO (Multiple Input Multiple Output) communication. The antenna 305 is used by the transmitter 303 and the receiver 304 for transmitting and receiving, respectively, radio signals.

Figure 4:
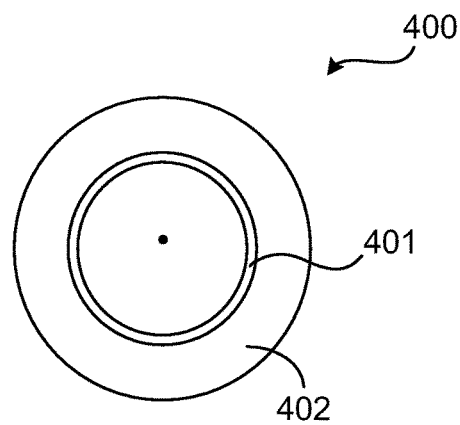
FIG. 4 is a schematic illustration of an embodiment of a computer program product of the present disclosure.

FIG. 4 illustrates a computer program product 400. The computer program product 400 comprises a computer readable medium 402 comprising a computer program 401 in the form of computer-executable components 401. The computer program/computer-executable components 401 may be configured to cause a device, e.g. a network node 101 or a radio device 102 or 103 as discussed above, to perform an embodiment of a method of the present disclosure. The computer program/computer-executable components may be run on the processing unit 201 or 301 of the device for causing the device to perform the method. The computer program product 400 may e.g. be comprised in a storage unit or memory 202 or 302 comprised in the device and associated with the processing unit 201 or 301. Alternatively, the computer program product 400 may be, or be part of, a separate, e.g. mobile, storage means, such as a computer readable disc, e.g. CD or DVD or hard disc/drive, or a solid state storage medium, e.g. a RAM or Flash memory.

Figure 5:
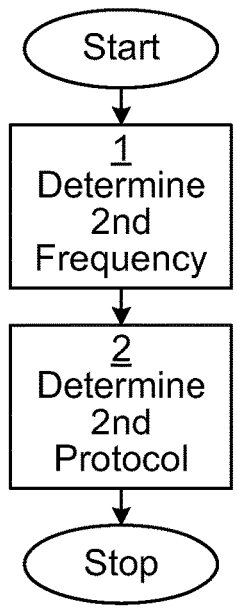
FIG. 5 is a schematic flow chart of an embodiment of a method of the present disclosure.

FIG. 5 is a schematic flow chart of embodiments of a method of the present disclosure. The method of FIG. 5 may e.g. be performed by the first radio device 102 or the network node 101. The first radio device 102 is in radio communication with the second radio device 103 by means of the network node 101, either cellular communication or NW assisted D2D communication. For this communication a first frequency resource and a first communication protocol is used. In this situation, the method embodiment of FIG. 5 can be applied. A second frequency resource is determined 1, for use for non-network assisted D2D communication between the first and second radio devices in case of a radio link failure between said at least one radio device and the network node. A second communication protocol is determined 2, for use for the non-network assisted D2D communication between the first and second radio devices in the case of a radio link failure between said at least one radio device and the network node.

Figure 6:
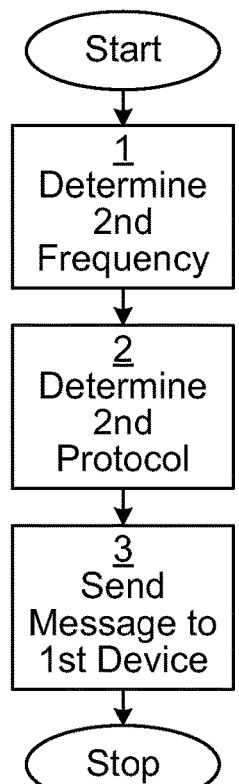
FIG. 6 is a schematic flow chart of an embodiment of a method of a network node, of the present disclosure.

FIG. 6 is a schematic flow chart of embodiments of a method of the present disclosure. The method of FIG. 6 is performed in the network node 101. Again, the first radio device 102 is in radio communication with the second radio device 103 by means of the network node 101, either cellular communication or NW assisted D2D communication. For this communication a first frequency resource and a first communication protocol is used. In this situation, the method embodiment of FIG. 6 can be applied. As in the method of FIG. 5, a second frequency resource is determined 1, for use for non-network assisted D2D communication between the first and second radio devices in case of a radio link failure between said at least one radio device and the network node. A second communication protocol is determined 2, for use for the non-network assisted D2D communication between the first and second radio devices in the case of a radio link failure between said at least one radio device and the network node. Further, at least one message is sent 3 to the first radio device 102, the at least one message comprising information about the determined 1 & 2 second frequency resource and second communication protocol, the information being intended to enable the first radio device to initiate non-network assisted D2D communication with the second radio device 103 using said determined 1 & 2 second frequency resource and second communication protocol in the case of a radio link failure between said at least one radio device and the network node.

Figure 7:
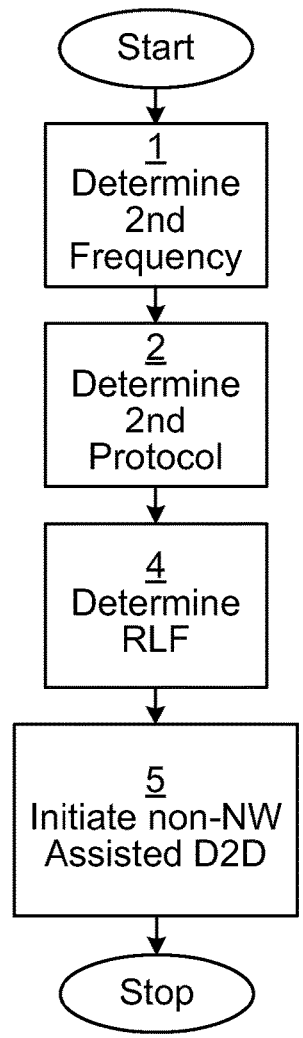
FIG. 7 is a schematic flow chart of an embodiment of a method of a radio device, of the present disclosure.

FIG. 7 is a schematic flow chart of embodiments of a method of the present disclosure. The method of FIG. 7 is performed in the first radio device 102. Again, the first radio device 102 is in radio communication with the second radio device 103 by means of the network node 101, either cellular communication or NW assisted D2D communication. For this communication a first frequency resource and a first communication protocol is used. In this situation, the method embodiment of FIG. 7 can be applied. As in the method of FIGS. 5 and 6, a second frequency resource is determined 1, for use for non-network assisted D2D communication between the first and second radio devices in case of a radio link failure between said at least one radio device and the network node. A second communication protocol is determined 2, for use for the non-network assisted D2D communication between the first and second radio devices in the case of a radio link failure between said at least one radio device and the network node. Further, it is determined 4 that the radio link to the network node 101 has failed. Also, non-network assisted D2D communication is initiated 5 with the second radio device 103, using the determined 1 second frequency resource and the determined 2 second communication protocol. In some embodiments, the first radio device sends information about the determined 1 second frequency resource and the determined 2 second communication protocol to the second radio device before initiating 5 the handover. In some embodiments, the first radio device sends information about the determined 1 second frequency resource and the determined 2 second communication protocol to the network node before initiating 5 the handover and/or before RLF.

Figure 8:
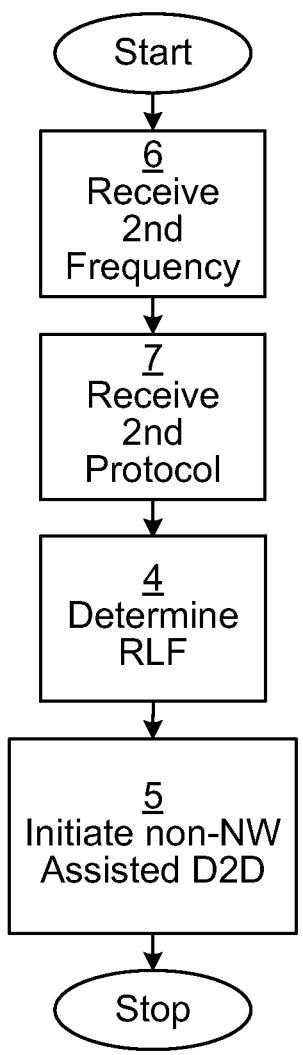
FIG. 8 is a schematic flow chart of an embodiment of a method of a radio device, of the present disclosure.

FIG. 8 is a schematic flow chart of embodiments of a method of the present disclosure. The method of FIG. 8 is performed in the first radio device 102 in an event that both the second frequency resource has been determined 1 and the second communication protocol has been determined 2 in the NW 100, e.g. in accordance with the embodiments of FIG. 5 or FIG. 6. Again, the first radio device 102 is in radio communication with the second radio device 103 by means of the network node 101, either cellular communication or NW assisted D2D communication. For this communication a first frequency resource and a first communication protocol is used. In this situation, the method embodiment of FIG. 8 can be applied. Information about a second frequency resource to use for non-network assisted D2D communication between the first and second radio devices in case of a radio link failure between the first radio device and the network node is received 6 from the network node 101. Information about a second communication protocol to use for non-network assisted D2D communication between the first and second radio devices in the case of a radio link failure between the first radio device 102 and the network node 101 is received 7 from the network node 101. It is determined 4 whether the radio link to the network node 101 has failed. If it has been determined 4 that the radio link to the network node 101 has failed, non-network assisted D2D communication with the second radio device 103 is initiated 5, using the second frequency resource and the second communication protocol. In some embodiments, the first radio device sends information about the determined 1 second frequency resource and the determined 2 second communication protocol to the second radio device before initiating 5 the handover.

Figure 9:
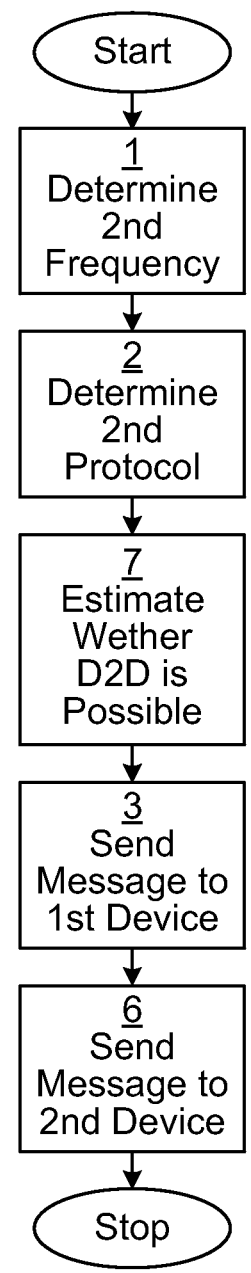
FIG. 9 is a schematic flow chart of an embodiment of a method of a network node, of the present disclosure.

FIG. 9 is a schematic flow chart of embodiments of a method of the present disclosure. The method of FIG. 9 is performed in the network node 101. Again, the first radio device 102 is in radio communication with the second radio device 103 by means of the network node 101, either cellular communication or NW assisted D2D communication. For this communication a first frequency resource and a first communication protocol is used. In this situation, the method embodiment of FIG. 9 can be applied. As in the method of FIGS. 5, 6 and 7, a second frequency resource is determined 1, for use for non-network assisted D2D communication between the first and second radio devices in case of a radio link failure between said at least one radio device and the network node. A second communication protocol is determined 2, for use for the non-network assisted D2D communication between the first and second radio devices in the case of a radio link failure between said at least one radio device and the network node. In some embodiments, the network node estimates 7 the likelihood of it being possible to initiate non-network assisted D2D radio communication between the first and second radio devices, before the sending 3 of a message to the first radio device. The estimation 7 may e.g. be based on the respective configurations of the first and/or second devices, or on the proximity of the devices to each other e.g. whether both devices are served by the same base station or based on obtained geographical positions of one or both of the first and second devices. If the network node 101 has estimated 7 that the radio devices 102 and 103 are likely to be able to initiate non-network assisted D2D radio communication with each other, the network node (as in the embodiment of FIG. 6) sends 3 at least one message to the first radio device 102, the at least one message comprising information about the determined 1 & 2 second frequency resource and second communication protocol, the information being intended to enable the first radio device to initiate non-network assisted D2D communication with the second radio device 103 using said determined 1 & 2 second frequency resource and second communication protocol in the case of a radio link failure between said at least one radio device and the network node. In some embodiments, a message is sent 6 to the second radio device 103, the message comprising information about the determined 1 & 2 second frequency resource and second communication protocol, the information being intended to enable the second radio device to initiate non-network assisted D2D communication with the first radio device 102 using said determined second frequency resource and second communication protocol in the case of a radio link failure between said at least one radio device and the network node.

The non-NW assisted D2D communication being initiated/set up in accordance with an embodiment of the present disclosure, such as in accordance with any of the FIGS. 5-9 may be in accordance with any of the D2D communication protocols discussed herein, such as a WLAN protocol, a Bluetooth protocol, a Zigbee protocol or an LTE D2D protocol.

In an embodiment, the NW node 101 decides, based on for instance device capability of the first radio device 102 (information that the NW node may receive once the first radio device 102 connects to the NW) to use WIFI direct, Bluetooth or LTE D2D. In another embodiment, the choice of second frequency resource and/or communication protocol is preconfigured by the NW node 101, or by the currently used communication standard/protocol. In yet another embodiment, the NW node 101 decides, based on some external information received, e.g. from radio devices 102 and/or 103 (or measured by the NW node 101), which second frequency resource and/or communication protocol that is best based on e.g. interference situation/load in the second frequency resource. The same approaches/methods above may be used additionally or alternatively for determining the second frequency resource to use.

Below follow some other embodiments of the present disclosure.

According to an aspect of the present disclosure, there is provided a network node configured for being served by a first radio device when the first radio device is in radio communication with a second radio device using a first frequency resource and a first communication protocol by means of the network node. The network node comprises means for determining a second frequency resource to use for non-network assisted D2D communication between the first and second radio devices in case of a radio link failure between said at least one radio device and the network node. The network node also comprises means for determining a second communication protocol to use for the non-network assisted D2D communication between the first and second radio devices in the case of a radio link failure between said at least one radio device and the network node. The network node also comprises means for sending at least one message to the first radio device, the at least one message comprising information about the determined second frequency resource and second communication protocol, the information being intended to enable the first radio device to initiate non-network assisted D2D communication with the second radio device using said determined second frequency resource and second communication protocol in the case of a radio link failure.

According to an aspect of the present disclosure, there is provided a first radio device configured for being in radio communication with a second radio device using a first frequency resource and a first communication protocol by means of a network node, and for being served by said network node. The first radio device comprises means for determining a second frequency resource to use for non-network assisted D2D communication between the first and second radio devices in case of a radio link failure between said at least one radio device and the network node. The first radio device also comprises means for determining a second communication protocol to use for the non-network assisted D2D communication between the first and second radio devices in the case of a radio link failure between said at least one radio device and the network node. The first radio device also comprises means for determining that the radio link to the network node has failed. The first radio device also comprises means for initiating non-network assisted D2D communication with the second radio device, using the determined second frequency resource and the determined second communication protocol.

According to an aspect of the present disclosure, there is provided a first radio device configured for being in radio communication with a second radio device using a first frequency resource and a first communication protocol by means of a network node, and for being served by said network node. The first radio device comprises means for receiving, from the network node, information about a second frequency resource to use for non-network assisted device-to-device, D2D, communication between the first and second radio devices in case of a radio link failure between the first radio device and the network node. The first radio device also comprises means for receiving, from the network node, information about a second communication protocol to use for non-network assisted D2D communication between the first and second radio devices in the case of a radio link failure between the first radio device and the network node. The first radio device also comprises means for determining that the radio link to the network node has failed. The first radio device also comprises means for initiating non-network assisted D2D communication with the second radio device using the second frequency resource and the second communication protocol.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method in a network node for enabling non-network assisted device-to-device (D2D) radio communication between a first radio device and a second radio device, said first radio device and second radio device being in radio communication using a first frequency resource and a first communication protocol by means of the network node, at least one of the radio devices being served by said network node, the method comprising:
   determining a second frequency resource to use for the non-network assisted D2D communication between the first and second radio devices in case of a radio link failure between said at least one radio device and the network node, in advance of occurrence of the radio link failure;
   determining a second communication protocol to use for the non-network assisted D2D communication between the first and second radio devices in the case of a radio link failure between at least one of said first and second radio devices and the network node, in advance of occurrence of the radio link failure;

sending at least one message to the first radio device in advance of occurrence of the radio link failure, the at least one message comprising information about the determined second frequency resource and second communication protocol to enable the first radio device to initiate non-network assisted D2D communication with the second radio device using said determined second frequency resource and second communication protocol in the case of the radio link failure between said at least one radio device and the network node; and enabling said first radio device, in the event of the occurrence of the radio link failure, to initiate non-network assisted D2D communication between the first and second radio devices using the determined second frequency resource and the second communication protocol.

2. The method of claim 1, further comprising:

sending a message to the second radio device, the message comprising information about the determined second frequency resource and second communication protocol for enabling the second radio device to initiate non-network assisted D2D communication with the first radio device using said determined second frequency resource and second communication protocol in the case of a radio link failure between said at least one radio device and the network node.

3. The method of claim 1, further comprising:

estimating the likelihood that the first and second radio devices are able to initiate non-network assisted D2D radio communication between each other, before the sending of a message to the first radio device.

4. A method of a first radio device for enabling non-network assisted device-to-device (D2D) radio communication between said first radio device and a second radio device, said first radio device being in radio communication with said second radio device using a first frequency resource and a first communication protocol by means of a network node, the first radio device also being served by said network node, the method comprising:

receiving, from the network node, information about a second frequency resource to use for non-network assisted D2D communication between the first and second radio devices in case of a radio link failure between the first radio device and the network node in advance of occurrence of the radio link failure;

receiving, from the network node, information about a second communication protocol to use for non-network assisted D2D communication between the first and second radio devices in the case of a radio link failure between the first radio device and the network node in advance of occurrence of the radio link failure, wherein receipt of the information about the second frequency resource and the second communication protocol enables said first radio device, in the event of the occurrence of the radio link failure, to initiate non-network assisted D2D communication between the first and second radio devices using the second frequency resource and the second communication protocol;

determining that the radio link to the network node has failed; and initiating non-network assisted D2D communication with the second radio device using the second frequency resource and the second communication protocol.

5. The method of claim 1, wherein both the first and the second radio devices initially are served by the network node and the radio communication between the first and second radio devices is via said network node.

6. The method of claim 1, wherein the radio communication between the first and second radio devices initially is network assisted D2D communication by means of the network node.

7. The method of claim 1, wherein the network node is one of a base station, a radio access network node, and a core network node.

8. The method of claim 1, wherein the second frequency resource is within an unlicensed frequency band.

9. The method of claim 1, wherein the second communication protocol is one of a Wireless Local Area Network protocol, a Bluetooth protocol, a FlashlinQ protocol and a Zigbee protocol.

10. The method of claim 1, wherein the second communication protocol is a long term evolution (LTE) D2D communication protocol.

11. A nontransitory processor-readable storage medium comprising a computer program for enabling non-network assisted device-to-device (D2D) radio communication between a first radio device and a second radio device, said first radio device and second radio device being in radio communication using a first frequency resource and a first communication protocol by means of a network node, at least one of which radio devices being served by said network node, the computer program comprising computer program code that, when run on a processor of a network node device, causes the device to:

determine a second frequency resource to use for non-network assisted D2D communication between the first and second radio devices in case of a radio link failure between said at least one radio device and the network node in advance of occurrence of the radio link failure;

determine a second communication protocol to use for the non-network assisted D2D communication between the first and second radio devices in the case of a radio link failure between said at least one radio device and the network node in advance of occurrence of the radio link failure;

send at least one message to the first radio device in advance of occurrence of the radio link failure, the at least one message comprising information about the determined second frequency resource and second communication protocol for enabling the first radio device to initiate non-network assisted D2D communication with the second radio device using said determined second frequency resource and second communication protocol in the case of the radio link failure between said at least one radio device and the network node; and enable said first radio device, in case of radio link failure, in the event of the occurrence of the radio link failure, to initiate non-network assisted D2D communication between the first and second radio devices using the determined second frequency resource and the second communication protocol.

12. A nontransitory processor-readable storage medium comprising a computer program for enabling non-network assisted device-to-device (D2D) radio communication between a first radio device in radio communication with a second radio device using a first frequency resource and a first communication protocol by means of a network node, the first radio device being served by said network node, the computer program comprising computer program code that, when run on a processor of the first radio device, causes said first radio device to:
  receive, from the network node, information about a second frequency resource to use for non-network assisted D2D communication between the first and second radio devices in case of a radio link failure between the first radio device and the network node in advance of occurrence of the radio link failure;
  receive, from the network node, information about a second communication protocol to use for non-network assisted D2D communication between the first and second radio devices in the case of a radio link failure between the first radio device and the network node in advance of occurrence of the radio link failure, wherein receipt of the information about the second frequency resource and the second communication protocol enables said first radio device, in the event of the occurrence of the radio link failure, to initiate non-network assisted D2D communication between the first and second radio devices using the second frequency resource and the second communication protocol;
  determine that the radio link to the network node has failed; and
  initiate non-network assisted D2D communication with the second radio device using the second frequency resource and the second communication protocol.

13. A network node configured for enabling non-network assisted device-to-device (D2D) radio communication between a first radio device and a second radio device, the first radio device being served by the network node and being in radio communication with the second radio device using a first frequency resource and a first communication protocol by means of the network node, the network node comprising:
  a processor; and
  a storage unit storing instructions that, when executed by the processor, cause the network node to:
  determine a second frequency resource to use for non-network assisted D2D communication between the first and second radio devices in case of a radio link failure between said at least one radio device and the network node in advance of occurrence of the radio link failure;
  determine a second communication protocol to use for the non-network assisted D2D communication between the first and second radio devices in the case of a radio link failure between said at least one radio device and the network node in advance of occurrence of the radio link failure;
  send at least one message to the first radio device in advance of occurrence of the radio link failure, the at least one message comprising information about the determined second frequency resource and second communication protocol to enable the first radio device to initiate non-network assisted D2D communication with the second radio device using said determined second frequency resource and second communication protocol in the case of a radio link failure; and
  enable said first radio device, in case of radio link failure, in the event of the occurrence of the radio link failure, to initiate non-network assisted D2D communication between the first and second radio devices using the determined second frequency resource and the second communication protocol.

14. A first radio device configured to be enabled for non-network assisted device-to-device (D2D) radio communication between said first radio device and a second radio device, said first radio device configured for being in radio communication with said second radio device using a first frequency resource and a first communication protocol by means of a network node, and for being served by said network node, the first radio device comprising:
  a processor; and
  a storage unit storing instructions that, when executed by the processor, cause the radio device to:
  receive, from the network node, information about a second frequency resource to use for non-network assisted D2D communication between the first and second radio devices in case of a radio link failure between the first radio device and the network node in advance of occurrence of the radio link failure;
  receive, from the network node, information about a second communication protocol to use for non-network assisted D2D communication between the first and second radio devices in the case of a radio link failure between the first radio device and the network node, wherein receipt of the information about the second frequency resource and the second communication protocol enables said first radio device, in the event of the occurrence of the radio link failure, to initiate non-network assisted D2D communication between the first and second radio devices using the second frequency resource and the second communication protocol;
  determine that the radio link to the network node has failed; and
  initiate non-network assisted D2D communication with the second radio device using the second frequency resource and the second communication protocol.

* * * * *